(No Model.) 3 Sheets—Sheet 2.

J. FAHRNEY.
COMBINED EARTH BOX AND DUMPING CART.

No. 307,851. Patented Nov. 11, 1884.

Witnesses.
Inventor
John Fahrney
By
Attorney (No Model.) 3 Sheets—Sheet 3.
J. FAHRNEY.
COMBINED EARTH BOX AND DUMPING CART.
No. 307,851. Patented Nov. 11, 1884.
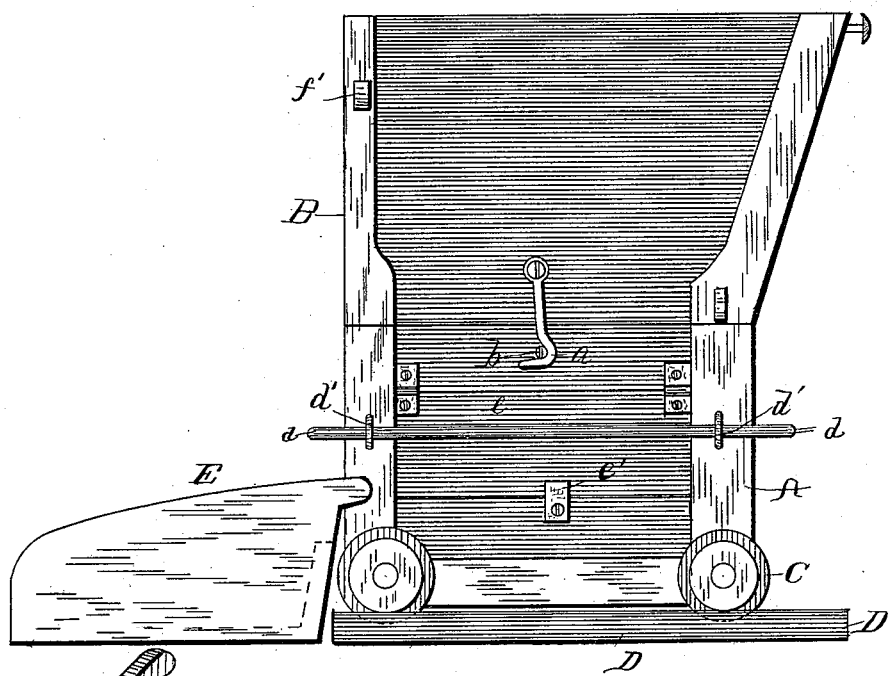
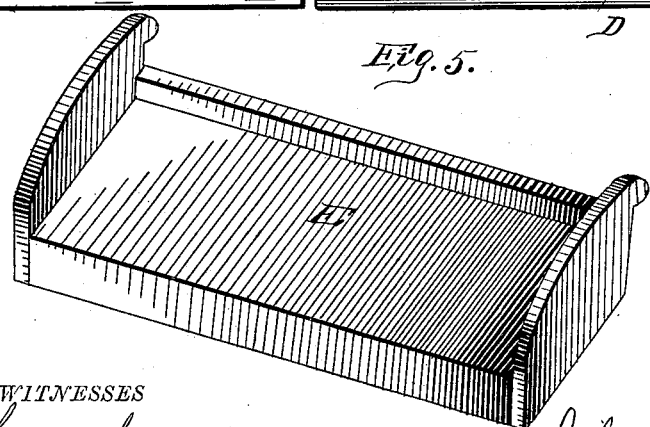
WITNESSES
INVENTOR

UNITED STATES PATENT OFFICE.

JOHN FAHRNEY, OF HAGERSTOWN, MARYLAND.

COMBINED EARTH-BOX AND DUMPING-CART.

SPECIFICATION forming part of Letters Patent No. 307,851, dated November 11, 1884.

Application filed April 11, 1884. (No model.)

*To all whom it may concern:*

Be it known that I, JOHN FAHRNEY, a citizen of the United States of America, residing at Hagerstown, in the county of Washington and State of Maryland, have invented certain new and useful Improvements in Earth-Dumping Carts, of which the following is a specification, reference being had therein to the accompanying drawings.

My invention relates to a combined earth-cart, dumping-box, and shelter for cemetery purposes; and it consists in the peculiar construction, combination, and arrangement of the parts whereby the device is rendered available for many purposes incident to cemeteries, substantially as hereinafter more fully shown and described.

Figure 1:
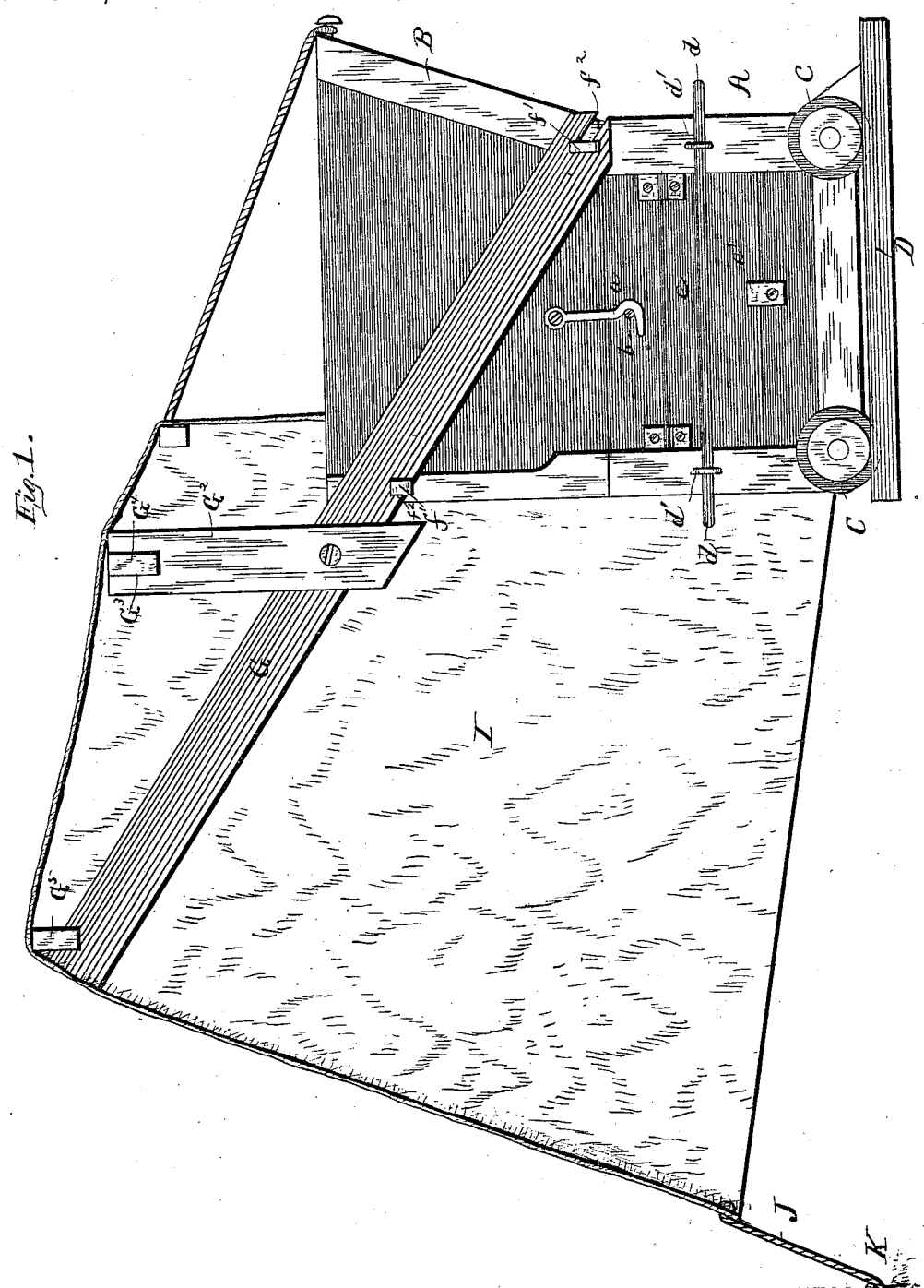
Figure 2:
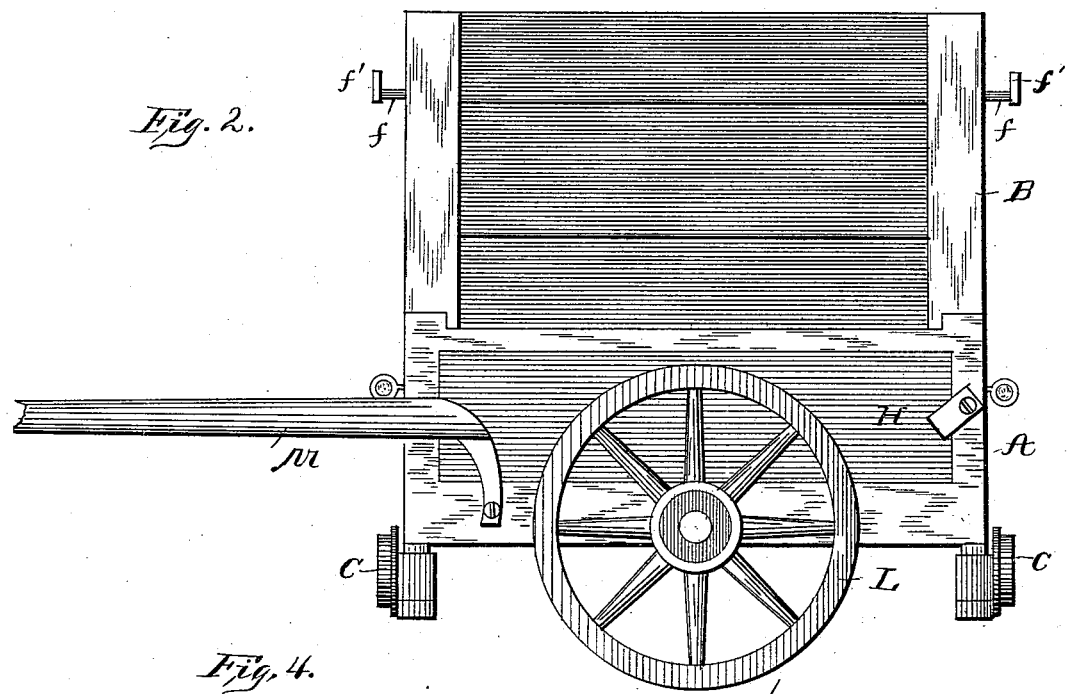
Figure 4:
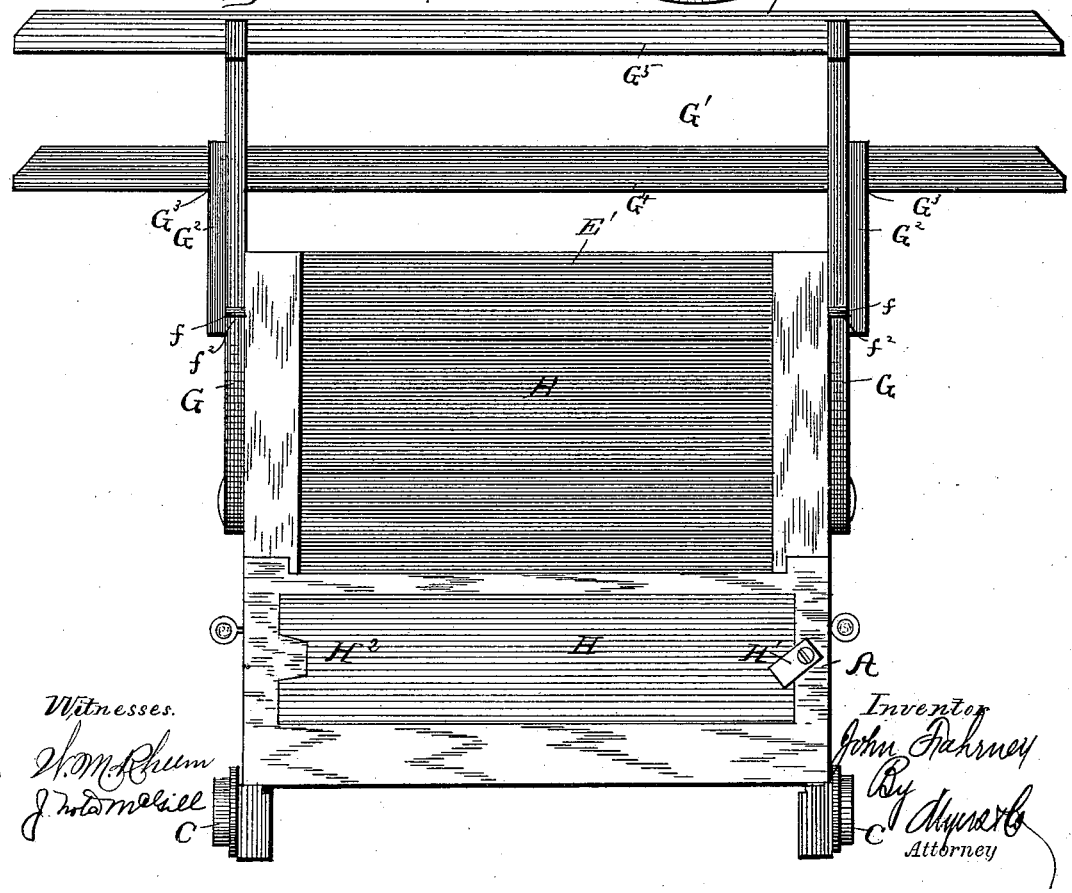

In the accompanying drawings, Figures 1, 2, and 3 are side elevations. Fig. 4 is a front view with the awning-canvas removed. Fig. 5 is a detail view of my invention.

The object of my invention is to provide, at little cost, a ready means of removing to and fro and dumping such earth as is usually dug up in cemeteries, of shielding from stormy and inclement weather cemetery grave-diggers while engaged at their labors, whose duties may not be deferred, and of providing a means of conveying earth in cemeteries either by hand-carriage, as where in narrow walks a horse cannot be employed, or by use of a horse where the width of the walks and the weight of the load renders it advantageous and advisable. In its construction I dispose on either lateral side of the dumping-box A the annex B, which is detachably connected thereto by means of the hooks $a$, removably secured by the pin or staple $b$ on either lateral side of the box A. Box A is of rectangular form, and its annex B, adapted to connect therewith, is made detachable, as aforesaid, in order that it may be dispensed with when the quantity of earth to be handled and removed renders its use non-essential. The box A is mounted on the wheels C, and the wheels are adapted to run, as shown in Fig. 1, on the shouldered sills or rails D, in order that the earth removed in grave-digging and placed in the box so as not to destroy or cover the usual grave-yard shrubbery may, by simply rolling the box along on the rails D, be removed from the opened grave during the burial-ceremony and readily returned to its brink or edge when the ceremony is over. The box A is also provided at either lateral end with the hand-rails $d$, which are removably inserted in the eyes or staples $d'$, which enables the workmen to improvise the box for conveying by hand earth or other light articles from point to point in the cemetery. To the box A is also removably attached the platform E, which is designed for the purpose of receiving the earth as thrown from the grave-excavation, and from which it is in turn shoveled into the earth-box and dump-cart, and it also serves to receive and direct the earth as dumped into the grave. The box A is also provided with the hinged door $e$, which is secured by the button $e'$, from which to dump the earth.

E' represents removable doors or shutters, which may be removed in filling the box until the earth shoveled therein reaches the height of the doors, thus lightening the labor and economizing the time required to fill the box.

The tail-board H, which is secured by the pivoted lug H', (see Fig. 4,) and the projecting stop H$^2$, against which it abuts to the box A, is designed for the purpose of discharging or dumping the earth from the box.

The annex B, the rear wall of which is constructed slightly flaring, has secured thereto on either lateral side corresponding headed pins $f$ and shouldered catches $f'$, the headed pins being adapted to the coincident slots $f^2$ in the inclined bars G, and the catch $f'$ being designed to hold and secure conjointly with the pins $f$ the inclined bars G, one of which is secured on either lateral side of the annex in an inclined position, to form a part of the shelter or awning frame G'. (See Fig. 4.) Each inclined bar has rigidly secured thereto a vertical standard, G$^2$, which is slotted at G$^3$ for reception of the cross-bar G$^4$, and the inclined bars G are also slotted for reception of the corresponding cross-bar G$^5$, thus forming the awning-frame. The shelter or awning I is open at one side, and its material is cut out and sewed together in such manner that its lower front part may be flared outwardly, as shown in Fig. 1, and it is provided with the cordage J, secured in orifices provided therein, and pins K, as is usual in securing tents.

The awning I is designed in inclement weather to be projected across the spot whereon a grave is to be dug in order to shelter the grave-diggers, and as the grave is dug the earth is thrown out onto the platform E, and from thence into the earth-cart.

When the contents of the cart are too great to render it portable, or when for other cause it becomes desirable to employ a draft-animal, it is suitably disposed on the vehicle-wheels L, and has secured thereto the shafts M, as shown in Fig. 2.

Having thus fully described my invention what I claim, and desire to secure by Letters Patent, is—

1. An earth-cart, dumping-box, and shelter for cemetery purposes, consisting of annex B, awning or shelter I, and platform E, constructed and arranged substantially as shown and described.

2. The combination of the box A, annex B, and awning or shelter I, substantially as shown, and for the purpose described.

3. In a combined earth-cart, dumping-box, and shelter for cemetery purposes, the box A, having annex B, removable handles $d$, doors or shutters E', hinged door $e$, tail-board H, awning I, and wheels C, substantially as shown, and for the purpose described.

In testimony whereof I affix my signature in presence of two witnesses.

JOHN FAHRNEY.

Witnesses:
  J. NOTA McGILL,
  W. M. RHEEM.